United States Patent
Ouellette

(10) Patent No.: US 8,250,719 B2
(45) Date of Patent: Aug. 28, 2012

(54) MULTIPLE LAYER ABSORBENT SUBSTRATE AND METHOD OF FORMATION

(75) Inventor: William Ouellette, Livermore, CA (US)

(73) Assignee: The Clorox Company, Oakland, CA (US)

( * ) Notice: Subject to any disclaimer, the term of this patent is extended or adjusted under 35 U.S.C. 154(b) by 577 days.

(21) Appl. No.: 12/397,146

(22) Filed: Mar. 3, 2009

(65) Prior Publication Data

US 2010/0227138 A1 Sep. 9, 2010

(51) Int. Cl.
*D04H 1/46* (2006.01)
*D04H 5/02* (2006.01)

(52) U.S. Cl. ........................................................ 28/104

(58) Field of Classification Search .................... 28/104, 28/105, 167, 103; 442/385, 387, 408, 413
See application file for complete search history.

(56) References Cited

U.S. PATENT DOCUMENTS

| | | | | |
|---|---|---|---|---|
| 3,485,706 A * | 12/1969 | Evans | ............................ | 428/134 |
| 3,508,308 A * | 4/1970 | Bunting, Jr. et al. | ............ | 28/104 |
| 4,379,799 A * | 4/1983 | Holmes et al. | ................. | 428/131 |
| 4,612,237 A * | 9/1986 | Frankenburg | ................. | 428/219 |
| 5,142,752 A * | 9/1992 | Greenway et al. | .............. | 28/105 |
| 5,670,234 A * | 9/1997 | Suehr et al. | .................... | 428/131 |
| 6,007,653 A * | 12/1999 | Pirinen et al. | .................. | 156/148 |
| 6,108,879 A | 8/2000 | Forte et al. | | |
| 6,163,943 A | 12/2000 | Johansson et al. | | |
| 6,762,138 B2 | 7/2004 | Ferreira et al. | | |
| 6,836,937 B1 | 1/2005 | Boscolo | | |
| 6,836,938 B2 * | 1/2005 | Fleissner | .......................... | 28/104 |
| 7,410,683 B2 | 8/2008 | Curro et al. | | |
| 7,422,660 B2 | 9/2008 | Billgren et al. | | |
| 2003/0217448 A1* | 11/2003 | Andersen | ......................... | 28/104 |
| 2004/0221437 A1* | 11/2004 | Fleissner | .......................... | 28/104 |
| 2005/0066490 A1* | 3/2005 | Orlandi | ............................ | 28/104 |
| 2005/0085149 A1 | 4/2005 | Sommer | | |
| 2005/0091811 A1* | 5/2005 | Billgren et al. | ................. | 28/104 |
| 2005/0155199 A1 | 7/2005 | Stralin et al. | | |
| 2005/0188513 A1* | 9/2005 | Vuillaume et al. | .............. | 28/103 |
| 2006/0185134 A1* | 8/2006 | Carter et al. | .................... | 28/104 |
| 2007/0000107 A1* | 1/2007 | Jeambar | ........................... | 28/104 |
| 2007/0022586 A1* | 2/2007 | Sommer et al. | ................. | 28/104 |
| 2008/0268205 A1 | 10/2008 | Vogel et al. | | |

FOREIGN PATENT DOCUMENTS

| EP | 033226 | 3/1988 |
|---|---|---|
| EP | 0333211 | 9/1989 |

OTHER PUBLICATIONS

International Search Report of PCT Application No. PCT/US10/25656, Apr. 21, 2010, 4 Pages.

* cited by examiner

Primary Examiner — Amy Vanatta
(74) Attorney, Agent, or Firm — Thomas C. Feix

(57) ABSTRACT

The present invention is directed to a method for making a multiple layer substrate comprising the steps of: (1) forming a carrier substrate; (2) depositing an air laid layer comprising natural fibers on top of the carrier substrate; (3) wetting the air laid layer with a source of low pressure water; (4) hydroentangling the air laid layer with the carrier substrate to form an integrated substrate. Another aspect of the present invention is the creation of a low-density cleaning substrate with a basis weight of less than 100 gsm, which comprises at least one layer of a carrier web and at least one layer comprising an air laid cellulosic material which are hydroentangled together to form an integrated substrate. The substrate may be a pre-loaded wipe, which is either moistened by a consumer prior to use or moistened prior to packaging. The composition loaded onto the substrate may contain dry and/or liquid compositions preferably for cleaning hard or soft surfaces.

13 Claims, No Drawings

MULTIPLE LAYER ABSORBENT SUBSTRATE AND METHOD OF FORMATION

BACKGROUND OF THE INVENTION

1. Field of the Invention

The present invention relates to a method of making a multiple layer substrate with at least one layer of a carrier substrate comprising synthetic fibers and at least one layer of an air laid material layer comprising natural fibers wherein the carrier substrate and air laid material layer are hydroentagled together to form an integrated substrate. Another aspect of the present invention, in the formation of a low-density cleaning substrate with a basis weight of less than 100 gsm, or less than 80 gsm, or less than 50 gsm which may be expanded in the z-direction to give the consumer the appearance of additional perceived bulk and thickness. The cleaning substrate comprises at least one layer of a carrier web and at least one layer comprising an air laid cellulosic material.

One embodiment of the invention, is the method of forming a dual layer substrate of carrier material and cellulosic material consists of the following steps:
(a) depositing a carrier web onto a forming screen, (b) air laying a layer of cellulosic material on top of the carrier web; (c) subjecting the intermediate substrate layers to a water curtain to saturate the cellulosic material with water; (d) hydroentangling the carrier web and air laid layer together to form a fully bonded dual layer substrate. The present invention further relates to cleaning substrates that are preferably used as wipes for delivering cleaning, disinfecting and surface protective compositions to both hard and soft surfaces. The cleaning substrate may be a pre-loaded cleaning wipe preferably comprised of non-woven materials.

2. Description of Related Art

A variety of liquid and solid or semi-solid ingredients have been deposited onto various forms of substrates for a variety of purposes. Typically, the substrates are wipes, formed of either a woven or non-woven material, and containing a liquid active composition. In one form, a non-woven material is soaked in a liquid cleaning active, and packaged in a canister. One example of this form of a disposable cleaning wipe is a product manufactured and sold by the Clorox Company under the trademark Clorox® Disinfecting Wipes.

Cleaning wipes have long been used for a variety of purposes. Such cleaning wipes have contained various compounds to accomplish their intended purpose. Cleaning wipes have included soaps and detergents to clean hard surfaces such as tiles, ceramics, counter tops, floors, and the like, as well soft surfaces such as fabrics and upholstery. Wipes have been formulated with personal care products, for example to clean an individual's hands. Cleaning wipes have also included ammonia to clean glass surfaces. Alcohol and various other biocides, such as quats, and biguanides have been included on cleaning wipes to disinfect a variety of surfaces. Cleaning wipes have also included waxes to polish and clean furniture.

All of the foregoing examples are limited in at least one or more of the following ways. First, many of the wipes or substrates have a basis weight of greater than 100 gsm because higher basis weight substrates are customarily used because of their ability to effectively absorb and hold cleaning compositions. Secondly, many of the existing wipes are flat and consumers have traditionally rejected flat, low basis weight cleaning wipes and substrates because they appear too flimsy or thin to effectively clean surfaces. Thirdly, many of the existing cleaning substrates which comprise meltblown and/or spunbond layers and cellulosic layers of pulp material require that the pulp layer be positioned in between two layers of meltblown or spunbond material layers or that the pulp layer be wetlaid or foam laid onto another layer of substrate material.

Hydroentangling or spunlacing is a technique introduced during the 1970's, see e.g. CA patent no. 841 938. The method involves forming a fiber web which is either drylaid, wetlaid, or carded after which the fibers are entangled by means of very fine water jets under high pressure. Several rows of water jets are directed against the fiber web which is supported by a movable wire. The entangled fiber web is then dried. The fibers that are used in the material can be synthetic or regenerated staple fibers, e.g. polyester, polyamide, polypropylene, rayon or the like, pulp fibers or mixtures of pulp fibers and staple fibers. Spunlace materials can be produced in high quality to a reasonable cost and have a high absorption capacity. They can e.g. be used as wiping material for household or industrial use, as disposable materials in medical care and for hygiene purposes etc.

Through e.g. EP-A-0 333 211 and EP-A-0 333 228 it is known to hydroentangle a fiber mixture in which one of the fiber components is meltblown fibers. In these patents, the meltblown fiber adheres to other fibers in the substrate material to form a base material. The base material, i.e. the fibrous material which is exerted to hydroentangling, either consists of at least two preformed fibrous layers where one layer is composed of meltblown fibers or of a "coform material" where an essentially homogeneous mixture of meltblown fibers and other fibers. These patents do not describe a process of forming a separate synthetic carrier web material and then subsequently forming an air laid layer comprising natural fibers where the layers are combined solely by hydroentangling. The process described by EP-A-0 333 211 and EP-A-0 333 228 require that the meltblown or coform materials trap or bond to any additional fibrous materials components so that the resulting substrate is bonded together by the meltblown or coform process in addition to the hydroentangling process.

U.S. Pat. No. 7,422,660 to Billgren, et al. is directed to a process for forming a nonwoven material comprising the steps of: (1) forming a continuous filament web; (2) wetting the continuous filament web; (3) wet laying or foam laying a layer of staple fibers comprising natural and/or synthetic fibers on top of the continuous formed filament web; and (4) hydroentangling the continuous filament web and the layer of staple fibers. The process of Billgren forms a nonwoven substrate of spunlaid or meltblown continuous filaments hydroentagled with a layer of synthetic and/or natural fibers which is wetlaid or foam laid. Since this invention only describes a process and substrate which may have natural fibers which are wet laid or foam laid, not air laid.

U.S. Pat. No. 7,410,683 to Curro, et al. describes a laminate web material comprising two discrete material webs of tufted material which are laminated together to form a patterned/tufted substrate. This patent refers to a wide variety of methods for forming textured webs including thermoforming, applying high-pressure plates or rolls, hydraulic forming, casting and embossing. This patent teaches the use of lamination and various texturing and patterning techniques, it does not employ a hydroentangling process to make the layers form an integrated substrate.

U.S. Pat. No. 6,163,943 to Johansson, et al. describes a method for producing a nonwoven material by hydroentangling a mixture of continuous filaments and natural fibers. In Johansson's process, a layer of continuous filaments is formed into a layer of material and then a second layer of foamformed material comprising natural fibers is formed, the two layers are hydroentangled together to form a substrate. The foamforming process described in Johnsson's invention requires that the fibrous web is formed from a dispersion of fibers in foamed liquid containing water and a tenside. The foamformed layer of material must be then drained through the filament layer to remove the excess liquid prior to hydroentangling the two layers together to form an integrated substrate. The process described in Johansson has the advantages of forming a well integrated substrate of continuous filaments and natural fibers which exhibits very good strength properties and absorption at basis weights of less than 100 gsm. The disadvantages of a substrate formed by this process are that the foamforming step of the process requires expensive and equipment which is not available at wide variety of nonwoven suppliers and the process requires a step of draining the foam formed material prior to hydroentangling the substrate materials.

U.S. Pat. No. 6,762,138 to Ferreira, et al. describes a multilayer a layer of wet-laid nonwoven web comprising pulped natural fibers and layer of synthetic fibers which are hydroentangled together to form a composite multilayer material. The process described by Ferreria, requires that the layer of natural pulp and unpulped fibers be formed by a wet papermaking process, which involves forming a fluid dispersion of the fibers and collecting the fibers on a fiber collecting wire to form a continuous sheet web material. The substrates described by Ferreria have a basis weight of about 60 to 160 gsm. Although the substrates described by Ferreria have the advantages of being strong, absorbent, with relatively low basis weights, they suffer from the disadvantage of requiring a wet laid process which involves expensive papermaking machines required for creating wet laid materials. The invention of Ferreria only teaches a substrate and method for forming single or multilayer substrates using wet-laid natural fibers.

In view of the present state of the art of non-woven substrates such as cleaning wipes, there remains a need for a low basis weight, non-woven substrate comprising air laid natural fibers and synthetic fibers which are hydroentangled to form an integrated substrate material. In addition, it is desirable to have a process for forming multiple layer hydroentangled substrates of natural and synthetic fibers which does not require wet laid natural fibers and the expensive processing machines required to form wet laid material layers.

SUMMARY OF THE INVENTION

One aspect the present invention is directed to a method for making a multiple layer substrate comprising the steps of: (1) forming a carrier substrate; (2) depositing an air laid layer comprising natural fibers adjacent to the carrier substrate; (3) wetting the air laid layer with a source of low pressure water; (4) hydroentangling the air laid layer with the carrier substrate to form an integrated substrate. Another aspect of the present invention is the creation of a low-density cleaning substrate with a basis weight of less than 100 gsm, or less than 80 gsm, or less than 50 gsm which may be expanded in the z-direction to give the consumer the appearance of additional perceived bulk and thickness. The cleaning substrate comprises at least one layer of a carrier web and at least one layer comprising an air laid cellulosic material.

Another aspect of the invention covers a low-density substrate, which is sufficiently absorbent and strong for hard surface cleaning applications. The basis weight of the substrate is about 15 to 80 gsm. The basis weight for the carrier web material is about 5 to 40 gsm, or about 5 to 20 gsm, or about 8 to 15 gsm. The basis weight of the air laid material layer is about 10 to 60 gsm, or 15 to 40 gsm, or 20 to 35 gsm The substrate may be a pre-loaded wipe, which is either moistened by a consumer prior to use or moistened prior to packaging or during the packaging process. The composition loaded onto the substrate may contain dry and/or liquid compositions preferably for cleaning hard or soft surfaces. The substrate may comprise a cleaning wipe that is dimensioned and configured for, and intended for, direct manual cleaning of the desired surface, as by manually wiping the surface. The wipe can also be dimensioned and configured for use with a cleaning implement or tool, for example a mop, scrubber, etc, which in turn may be manually, semi-manually, or automatically operated.

The fibrous web or substrate may comprise natural fibers, synthetic fibers, continuous fibers, staple fibers, discontinuous fibers, polypropylene, polyethylene, polyester, PET, copolymers of polypropylene, copolymers of polyethylene, copolymers of PET, water soluble polymers (such as pva, pla, etc.), wood pulp, regenerated cellulose, nylon, cotton, bicomponent fibers, continuous fibers, and combinations thereof including blends or layers of one or more of the above fibers. In a preferred embodiment of the invention, the fibrous web or substrate comprises fibers with a denier of about 0.3 to 10.

The substrate of the present invention contains at least one layer of carrier web material comprising synthetic fibers or a combination of synthetic and natural fibers. The carrier web layer comprises materials which are selected from the group consisting of: meltblown, spunbond, spunlaid, SMS (spunbond-meltblown-spunbond), coform, carded webs, thermal bonded, through-air-bonded, thermoformed, spunlace, hydroentangled, needled, chemically bonded and combinations thereof.

The substrate or wipe may be used to clean hard or soft surfaces. As used herein, the term "hard surface" includes, but is not limited to, bathroom surfaces (tub and tile, fixtures, ceramics), kitchen surfaces, countertops, appliances, flooring, glass, automobiles and the like. "Soft surfaces" include but are not limited to fabrics, leather, carpets, furniture, upholstery and other suitable soft surfaces. The active-carrying article of the present invention can be used in a variety of household, industrial and institutional applications.

In yet another aspect of the present invention, the article comprises two or more of the aspects, versions or embodiments described herein.

DETAILED DESCRIPTION OF SPECIFIC EMBODIMENTS

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

References herein to "one embodiment", "one aspect" or "one version" of the invention include one or more such embodiment, aspect or version, unless the context clearly dictates otherwise.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

As used herein, the terms "substrate" or "wipe" are intended to include any material on which a cleaning composition may be loaded. In functional application, a substrate is used to clean an article or a surface, as by wiping. Substrates comprise woven or non-woven materials, typically made from a plurality of fibers, as well as sponges, films and similar materials onto which cleaning compositions can be loaded as described herein. The substrate can be used by itself (typically by hand) or attached to a cleaning implement, such as a floor mop, handle, or a hand held cleaning tool, such as a toilet cleaning device.

"Cleaning composition" as used herein, is any fluid and/or solid composition used for cleaning hard and/or soft surfaces. Cleaning means any treatment of a surface which serves to remove or reduce unwanted or harmful materials such as soil, dirt or microbial contamination from a surface, and/or which imparts a desirable or beneficial aesthetic, health or safety effect to the surface such as depositing thereon a fragrance, color or protective coating or film.

"Pre-loaded wipes" as used herein, are wipes which are moistened, such as by wetting the wipe with a liquid composition prior to use by the consumer. "Pre-loaded wipes" as used herein, may also refer to wipes that are moistened prior to packaging in a generally moisture impervious container or wrapper. "Pre-loaded wipes" as used herein may even include dry wipes that are impregnated with liquid and dried prior to packaging or solid actives, including but not limited to cleaning agents. Furthermore, "pre-loaded wipes" as referred to herein may in addition, or in the alternative, include wet wipes that have been pre-moistened with liquid compositions, including but not limited to, liquid compositions, such as cleaning agents or lotions.

As used herein, the term "x-y dimension" refers to the plane orthogonal to the thickness of a substrate sheet. The x and y dimensions correspond to the length and width, respectively, of the sheet. In this context, the length of the sheet is the longest dimension of the sheet, and the width the shortest. Of course, the present invention is not limited to the use of cleaning sheets having a rhomboidal shape. Other shapes, such as circular, elliptical, and the like, can also be used.

As used herein, the term "z-dimension" refers to the dimension orthogonal to the length and width of the cleaning sheet of the present invention, or a component thereof. The z-dimension therefore corresponds to the thickness of the cleaning sheet or a sheet component. As used herein, the term "z-dimension expansion" refers to imparting bulk or thickness to a fibrous web by moving fibers out of the x-y dimension and into the z-dimension. A fibrous web with z-dimension expansion can be created by a wide variety of methods, including but not limited to, air texturing, abrasion bulking, embossing, thermoforming, SELFing and any other suitable methods.

As used herein, the term "fiber" refers to a thread-like object or structure from which textiles and non-woven fabrics are commonly made. The term "fiber" is meant to encompass both continuous and discontinuous filaments, and other thread-like structures having a length that is substantially greater than its diameter.

As used herein, the terms "non-woven" or "non-woven web" means a web having a structure of individual fibers, threads or yarns which are interlaid, but not in a regular and identifiable manner as in a woven or knitted web. The fiber diameters used in non-wovens are usually expressed in microns, or in the case of staple fibers, denier. Non-woven webs may be formed from many processes, such as, for example, by meltblowing, spunbonding, and bonded carded web processes.

As used herein, the term "basis weight" means the weight per unit area of the substrate or wipe. One method of determining basis weight, therefore, is to weigh a known area sample that is representative of the wipe or substrate. The units of basis weight are typically expressed as grams per square meter (gsm) or ounces of material per square yard. It is noted that to convert from osy to gsm, multiply osy by 33.91.

Non-Woven Materials

The substrate of the present invention can comprise meltblown, spunbond, spunlaid, SMS (spunbond-meltblown-spunbond), coform, airlaid, wetlaid, carded webs, thermal bonded, through-air-bonded, thermoformed, spunlace, hydroentangled, needled, chemically bonded and combinations thereof.

"Meltblown" means fibrous webs formed by extruding a molten thermoplastic material through a plurality of fine, usually circular, die capillaries as molten threads or filaments into converging high velocity heated gas. (e.g., air) streams, which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed for example, in U.S. Pat. No. 3,849,241 to Butin et al. Meltblown fibers are microfibers which may be continuous or discontinuous, are generally smaller than about 0.6 denier, and are generally self bonding when deposited onto a collecting surface. Meltblown fibers used in the present invention are preferably substantially continuous in length.

"Spunbond" refers to fibrous webs comprised of small diameter fibers which are formed by extruding molten thermoplastic material as filaments from a plurality of fine capillaries of a spinneret having a circular or other configuration, with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartmann, U.S. Pat. No. 3,502,538 to Petersen, and U.S. Pat. No. 3,542,615 to Dobo et al., each of which is incorporated herein in its entirety by reference. Spunbond fibers are quenched and generally not tacky when they are deposited onto a collecting surface. Spunbond fibers are generally continuous and often have average deniers larger than about 0.3, more particularly, between about 0.6 and 10.

"Spunlaid" materials are nonwoven fabrics made by the extrusion of filaments which are then laid down in the form of a web and subsequently bonded. The subsequent bonding of the filaments may be accomplished by a variety of different bonding techniques.

As used herein, the term "through-air bonding" or "TAB" means the process of bonding a nonwoven, for example, a bicomponent fiber web in which air which is sufficiently hot to melt one of the polymers of which the fibers of the web are made is forced through the web. The air velocity is between 100 and 500 feet per minute and the dwell time may be as long as 6 seconds. The melting and re-solidification of the polymer provides the bonding. Through air bonding has relatively restricted variability and since it requires the melting of at least one component to accomplish bonding and is therefore particularly useful in connection with webs with two components like conjugate fibers or those which include an adhesive. In the through-air bonder, air having a temperature above the melting temperature of one component and below the melting temperature of another component is directed from a surrounding hood, through the web, and into a perforated roller supporting the web. Alternatively, the through-air bonder may be a flat arrangement wherein the air is directed vertically downward onto the web. The operating conditions of the two configurations are similar, the primary difference being the geometry of the web during bonding. The hot air melts the lower melting polymer component and thereby forms bonds between the filaments to integrate the web.

"Hydroentangled" or "spunlace" refers to materials created by a method that involves forming a dry-laid, wet-laid or carded fiber web, where the fibers are entangled by means of very fine water jets under high pressure. A plurality of rows of water jets is directed towards the fiber web, which is carried on a moving wire. The entangled web is thereafter dried. Those fibers which are used in the material can be synthetic or regenerated staple fibers, e.g. polyester, polyamide, polypropylene, rayon and the like, pulp fibers or a mixture of pulp fibers and staple fibers. Spunlace material can be produced to a high quality at reasonable cost and display high absorption capability. Spunlace materials are frequently used as wiping materials for household or industrial applications and as disposable materials within health care industries, etc.

As used herein, the term "coform" means a process in which at least one meltblown diehead is arranged near a chute through which other materials are added to the base material or the web while it is forming. Such other materials may be pulp, superabsorbent particles, cellulose or staple fibers, for example. Coform processes are shown in U.S. Pat. No. 4,818,464 to Lau.

The term "carded web" refers to non-woven materials formed by the disentanglement, cleaning and intermixing of fibers to produce a continuous web, of generally uniform basis weight, suitable for subsequent processing. This is achieved by passing the fibers between relatively moving surfaces covered with card clothing. The carding processes as are known to those skilled in the art and further described, for example, in U.S. Pat. No. 4,488,928 to Alikhan and Schmidt, which is incorporated herein in its entirety by reference. As used herein, "bonded carded web" refers to webs that are made from staple fibers which are sent through a combing or carding unit, which breaks apart and aligns the staple fibers in the machine direction to form a generally machine direction-oriented fibrous non-woven web. Such fibers are usually purchased in bales which are placed in a picker which separates the fibers prior to the carding unit. Once the web is formed, it then is bonded by one or more of several known bonding methods. One such bonding method is powder bonding, wherein a powdered adhesive is distributed through the web and then activated, usually by heating the web and adhesive with hot air. Another suitable bonding method is pattern bonding, wherein heated calendar rolls or ultrasonic bonding equipment are used to bond the fibers together, usually in a localized bond pattern, though the web can be bonded across its entire surface if so desired. Another suitable and well-known bonding method, particularly when using conjugate staple fibers, is through-air bonding. Hydroentangling may also be used to bond carded webs.

An "air laid" nonwoven material in the present invention, comprises natural fibers or a combination of natural fibers and synthetic fibers. The natural fibers may be cellulosic materials which may regenerated or modified natural fibers such as wood pulp, hemp, wool, cotton, rayon, nylon, and other suitable fibers. "Airlaying" is a well-known process by which a fibrous nonwoven layer can be formed. In the airlaying process, bundles of small fibers having typical lengths ranging from about 3 to about 52 millimeters (mm) are separated and entrained in an air supply and then deposited onto a forming screen, which already contain other layers of materials, usually with the assistance of a vacuum supply. The randomly deposited fibers then are bonded to one another using, for example, hot air or a spray adhesive. Airlaying is taught in, for example, U.S. Pat. No. 4,640,810 to Laursen et al.

The non-wovens used in the process according to the invention may be produced by any of the known processes described above and any combinations of these processes. In addition, any changes or modifications to the process known to one skilled in the art should also be considered to be within the scope of the present invention.

Types of Fibers

The fibrous web or substrate may comprise natural fibers, synthetic fibers, polypropylene, polyethylene, polyester, PET, wood pulp, regenerated cellulose, nylon, cotton, bicomponent fibers, continuous fibers, and combinations thereof including blends or a layers of one or more of the above fibers. In a preferred embodiment of the invention, the fibrous web or substrate comprises fibers with a denier of about 0.3 to 10.

Suitable thermoplastic fibers can be made from a single polymer (monocomponent fibers), or can be made from more than one polymer (e.g., bicomponent or multicomponent fibers). Multicomponent fibers are described in U.S. Pat. App. 2003/0106568 to Keck and Arnold. Bicomponent fibers are described in U.S. Pat. No. 6,613,704 to Arnold and Myers and references therein. Multicomponent fibers of a wide range of denier or dtex are described in U.S. Pat. App. 2002/0106478 to Hayase et. al.

As used herein, the term "bicomponent fibers" refers to fibers formed from at least two different polymers extruded from separate extruders but spun together to form one fiber. Bicomponent fibers are also sometimes referred to as conjugate fibers or multicomponent fibers. The polymers are arranged in substantially constantly positioned distinct zones across the cross-section of the bicomponent fibers and extend continuously along the length of the bicomponent fibers. The configuration of such a bicomponent fiber may be, for example, a sheath/core arrangement wherein one polymer is surrounded by another, or may be a side-by-side arrangement, a pie arrangement, or an "islands-in-the-sea" arrangement, each as is known in the art of multicomponent, including bicomponent, fibers.

The "bicomponent fibers" may be thermoplastic fibers that comprise a core fiber made from one polymer that is encased within a thermoplastic sheath made from a different polymer or have a side-by-side arrangement of different thermoplastic fibers. The first polymer often melts at a different, typically lower, temperature than the second polymer. In the sheath/core arrangement, these bicomponent fibers provide thermal bonding due to melting of the sheath polymer, while retaining the desirable strength characteristics of the core polymer. In the side-by-side arrangement, the fibers shrink and crimp creating z-direction expansion.

Bicomponent fibers can be splittable fibers, such fibers being capable of being split lengthwise before or during processing into multiple fibers each having a smaller cross-sectional dimension than the original bicomponent fiber. Splittable fibers have been shown to produce softer nonwoven webs due to their reduced cross-sectional dimensions. Representative splittable fibers useful in the present invention include type T-502 and T-512 16 segment PET/nylon 6 2.5 denier fibers; and type T-522 16 segment PET/PP splittable fibers, all available from Fiber Innovation Technology, Johnson City, Tenn.

Suitable bicomponent fibers for use in the present invention can include sheath/core or side-by-side fibers having the following polymer combinations: polyethylene/polypropylene, polyethylvinyl acetate/polypropylene, polyethylene/polyester, polypropylene/polyester, copolyester/polyester, and the like. Particularly suitable bicomponent thermoplastic fibers for use herein are those having a polypropylene or polyester core, and a lower melting copolyester, polyethylvinyl acetate or polyethylene sheath (e.g., those available from Danaklon a/s, Chisso Corp., and CELBOND®, available from Hercules). These bicomponent fibers can be concentric or eccentric. As used herein, the terms "concentric" and "eccentric" refer to whether the sheath has a thickness that is even, or uneven, through the cross-sectional area of the bicomponent fiber. Eccentric bicomponent fibers can be desirable in providing more compressive strength at lower fiber thicknesses.

In a preferred embodiment of the invention, the fibers in the substrate can be comprised of hydrophilic fibers or a combination of both hydrophilic and hydrophobic fibers. The use of hydrophilic fibers for the substrate is desirable because it increases the absorption and retention fluids in the substrate, which is particularly beneficial for increasing the loading capacity of low-density and/or synthetic substrates. Suitable hydrophilic fibers for use in the present invention include cellulosic fibers, modified cellulosic fibers, rayon, cotton, and polyester fibers, such as hydrophilic nylon (HYDROFIL®). Suitable hydrophilic fibers can also be obtained by hydrophilizing hydrophobic fibers, such as surfactant-treated or silica-treated thermoplastic fibers derived from, for example, polyolefins such as polyethylene or polypropylene, polyacrylics, polyamides, polystyrenes, polyurethanes and the like.

The surface of the hydrophobic thermoplastic fiber can be rendered hydrophilic by treatment with a surfactant, such as a nonionic or anionic surfactant, e.g., by spraying the fiber with a surfactant, by dipping the fiber into a surfactant or by including the surfactant as part of the polymer melt in producing the thermoplastic fiber. Upon melting and re-solidification, the surfactant will tend to migrate to the surfaces of the thermoplastic fiber. Suitable surfactants include nonionic surfactants such as Brij® 76 manufactured by ICI Americas, Inc. of Wilmington, Del., and various surfactants sold under the Pegosperse® trademark by Glyco Chemical, Inc. of Greenwich, Conn. In addition to nonionic surfactants, anionic surfactants can also be used to create a hydrophilic treatment. These surfactants can be applied to the thermoplastic fibers at levels of, for example, from about 0.2 to about 1 g per square meter of thermoplastic fiber.

Basis Weight and Density

The fibrous web or substrate of the present invention has a basis weight of about 15 to 80 gsm. Most preferably, the basis weight of the substrate is about 20 to 40 gsm. In comparison to the substrates used as cleaning wipes currently on the market with basis weights of 100 gsm or more. The basis weight for the carrier web material is about 5 to 40 gsm, or about 5 to 20 gsm, or about 8 to 15 gsm. In one embodiment of the invention, the carrier web material is a meltblown or spunbond material which comprises synthetic fibers selected from polypropylene, polyethylene, PET, and mixtures or combinations thereof. The carrier web material layer gives strength to the air laid material layer and can provide a resilient and/or scrubby surface on the exterior of the substrate. The basis weight of the air laid material layer is about 10 to 60 gsm, or 15 to 40 gsm, or 20 to 35 gsm. The air laid material layer comprises natural fibers, preferably cellulosic fibers selected from cotton, wood pulp, rayon, and mixtures or combinations thereof.

In addition, the density of the substrates of the present invention is less than about 0.12 g/cc. Most preferably the density of the substrates is in the range of about 0.005 to 0.07 g/cc. The lower basis weight and density substrates of the present invention are desirable because they are less costly to produce than the currently available substrates used for cleaning wipes, but they still retain sufficient strength and dispensing capacity to be effective for cleaning.

Processes for Forming a Multilayer Wipe Substrate

In one embodiment of the invention, the method for forming a multilayer substrate comprises the steps of: (a) depositing a carrier web (b) air laying a layer of cellulosic material adjacent to the carrier web; (c) subjecting the intermediate substrate layers to a water curtain to saturate the cellulosic material with water; (d) hydroentangling the carrier web and air laid layer together to form a fully bonded dual layer substrate. In one embodiment, the carrier web has two surfaces to support the air laid cellulosic material, a top surface and a bottom surface. In one embodiment, air laid layer may be deposited adjacent to the top surface of the carrier web, or adjacent to the bottom of the carrier web, or it may be deposited adjacent to both the top and bottom surfaces of the carrier web. In a preferred embodiment, the cellulosic material layer is air laid on top of the carrier substrate so that it is in direct contact with the top surface of the carrier web.

The carrier web material comprises synthetic fibers selected from the group consisting of: polypropylene, polyethylene, polyester, PET, bicomponent fibers, continuous fibers, and combinations thereof including blends of one or more of the above fibers. In one embodiment of the invention, the carrier web also comprises natural fibers selected from the group consisting of: wood pulp, cotton, wool, rayon, nylon, hemp, bamboo, coconut, and other cellulosic based materials. The carrier web may be formed by a variety of processes, such as but not limited to, spunbond, meltblown, SMS, carded, thermalbonded, through-air bonded, needled, chemical bonded, and any combinations thereof.

In one embodiment of the invention, the carrier web is deposited on to a forming surface such as, but not limited to, a roll, a wire, a screen, another layer of fibrous material. In one embodiment, the forming screen may be un-patterned or patterned to impart a surface pattern of dots, ridges, other shapes and variations in the surface of the carrier web. A patterned surface in the carrier web may be desirable for some substrates which are used for wipes, tool heads, cleaning pads, etc. The patterning may aid in hand feel and may contribute to enhanced particle pick up, hair pick up or surface scrubbiness. The carrier web material provides strength and residency to the air laid natural fiber layer which would not be sufficiently strong by itself for hard surface cleaning applications. There may be one or more carrier web material layers in the layered substrate of the present invention. Each layer of carrier web material has a basis weight of about 5 to 40 gsm, or about 5 to 20 gsm, or about 8 to 15 gsm. In one embodiment of the invention, the substrate only contains one layer of spunbond or meltblown carrier web material, which has a basis weight of 5 to 20 gsm and is comprised of polyethylene and/or polypropylene fibers The layer of air laid material may comprise natural fibers selected from the group consisting of: wood pulp, cotton, wool, rayon, nylon, hemp, bamboo, coconut, and other cellulosic based materials. The air laid material layer may be formed on a forming surface such as a screen, wire, roll, or another layer of material, or any other common forming surface used in air laid processes. In another embodiment of the invention, the air laid layer may be formed on top of the carrier web material. In a further embodiment, a carrier web material layer is formed and an intermediate layer of material is formed on the carrier web and then the air laid material is formed on top of the intermediate layer. There may be one or more air laid material layers in the layered substrate of the present invention. Each layer of air laid material has a basis weight of about 10 to 60 gsm, or about 15 to 40 gsm, or about 20 to 35 gsm. The air laid material may contain natural fibers in addition to synthetic fibers. When the air laid layer is first deposited onto a forming surface or onto the carrier web material it is very lofty, which means has a z-direction thickness of greater than or equal to about 0.02 inches or about 0.5 mm.

Since the fibers of the air laid layer would be prone to being moved, disrupted or lost in processing if they were subjected to the high pressure water treatment required by the hydroentangling process, the air laid layer must first be wet thoroughly by a source of low pressure water prior to hydroentangling the carrier web and air laid layer together. The low pressure source of water should have a water pressure of less than 100 psi, preferably less than 10 psi, or 1 psi. Suitable examples for low pressure sources of water include, but are not limited to, sprayers, water curtains, drip lines or drip tubes, misters, etc. The air laid layer of material should be uniformly wet. When the air laid material is wet, the thickness of the air laid layer will decrease to less than 0.5 inch, or less than 0.10 inches, or less than 0.05 inches. Upon wetting the air laid layer material will approach its equilibrium density. The equilibrium density will depend on the content of the fibers or fiber mixture present in the air laid layer. Once the air laid layer is wet with a low pressure source of water, it may be combined with the carrier substrate material if it has not been already. Once the carrier web is positioned together with the air laid material the two layers are hydroentagled together under high water pressure, usually around 1000 to 8000 psi.

The present invention further relates to cleaning substrates that are preferably used as wipes for delivering cleaning, disinfecting and surface protective compositions to both hard and soft surfaces. The cleaning substrate may be a pre-loaded cleaning wipe preferably comprised of non-woven material Pre-Loaded Wipes and Cleaning Tools The fibrous web or substrate upon which a cleaning composition is loaded comprises a woven or nonwoven fibrous material, in the form of a wipe or pad. The substrate may further comprise a single or unitary layer, or may comprise multiple layers, which may or may not be adhered to one another.

In one embodiment, it is preferred that the substrate is produced in the form of a continuous roll. The substrate may also take the form of a continuous roll, which may be perforated at intervals to define user-generated cut sheets, or may remain in a roll and be marketed as such. The roll of substrate, with or without perforations, may be packaged in a suitable container or overwrap. It is also within the scope of the present invention to produce the substrate as a plurality of individual cut sheets. Thus in yet a further embodiment, the fibrous web is produced as a sheet or web which is cut, die-cut or otherwise sized into the desired appropriate shape and size. The individual sheets making up the substrate may similarly be packaged in a suitable container or overwrap.

In another aspect of the present invention, the cleaning wipe may be individually sealed with a heat-sealable and/or glueable thermoplastic overwrap (such as, but not limited to, polyethylene, Mylar and the like). In one embodiment, the cleaning wipes are packaged as numerous, individual sheets containing the particulate composition of the present invention. In another embodiment, the cleaning wipes are formed as a continuous web during the manufacturing process and loaded into a dispenser, such as a canister with a closure or a tub with closure.

In one embodiment, the active-carrying article may have on one surface an impermeable or backing layer, for example, as a moisture barrier, and/or may include an attachment layer to facilitate attachment of the substrate to a cleaning tool. Impermeable layers may comprise a polymeric film, such as a polyvinyl alcohol/acetate films or the like. An attachment layer may take any form to provide the function of securing the fibrous web network containing active to a correspondingly appropriate cleaning tool, again in virtually any form. An attachment layer may comprise, for example, a high loft fibrous material, or tufted or looped material formatted to attach to a hook material. Suitable tools to which the article herein may be attached comprise floor mops, tub and tile cleaning tools, toilet cleaners, automatic tools, robotic devices and the like.

Although only a few exemplary embodiments of this invention have been described in detail above, those skilled in the art will readily appreciate that many modifications are possible without materially departing from the novel teachings and advantages of this invention. Accordingly, all such modifications are intended to be included within the scope of this invention as defined in the following claims.

The invention claimed is

1. A method of making a multiple layer substrate comprising the steps of:
   (1) providing a carrier web;
   (2) depositing an air laid layer comprising natural fibers adjacent to the carrier web;
   (3) wetting the air laid layer with a source of low pressure water at a pressure of less than 100 psi; and
   (4) hydroentangling the air laid layer with the carrier web to form an integrated substrate; and
   wherein the hydroentangling step comprises water jets and said jets are directed onto the air laid layer.

2. The method of claim 1 wherein the carrier web is selected from the group consisting of: spunbond, meltblown, SMS, carded, thermalbonded, through-air bonded, needled, chemical bonded, and combinations thereof.

3. The method of claim 1 wherein the carrier web comprises synthetic fibers selected from the group consisting of: polypropylene, polyethylene, polyester, PET, bicomponent fibers, continuous fibers, and combinations thereof including blends of one or more of the above fibers.

4. The method of claim 1 wherein the carrier web has a basis weight of about 5 to 40 gsm.

5. The method of claim 1 wherein the carrier web has a basis weight of about 5 to 20 gsm.

6. The method of claim 1 wherein the air laid layer, prior to wetting, is at least 0.02 inch thick adjacent to the carrier substrate.

7. The method of claim 1 wherein the air laid layer has a basis weight of about 10 to 60 gsm.

8. The method of claim 1 wherein the air laid layer has a basis weight of about 20 to 35 gsm.

9. The method of claim 1 wherein the source of low pressure water is selected from a group consisting of: a water curtain, a drip tube, a spraying device.

10. The method of claim 1 wherein the air laid layer comprises natural fibers selected from the group consisting of: wood pulp, cotton, rayon, nylon, wool, hemp, and combinations thereof including blends of one or more of the above fibers.

11. A method of making a dual layer substrate comprising the steps of:
   (1) forming a carrier web;
   (2) depositing an air laid layer comprising wood pulp on top of the carrier web;
   (3) wetting the air laid layer with a source of low pressure water with less than 100 psi; and
   (4) hydroentangling the air laid layer with the carrier web to form an integrated substrate wherein the basis weight of the dual layer substrate is less than 80 gsm; and wherein the hydroentangling step comprises water jets and said jets are directed onto the air laid layer.

12. The method of claim 11 wherein the carrier web material is selected from the group consisting of: spunbond, meltblown, SMS, carded, wetlaid, airlaid, thermalbonded, hydroentangled, through-air bonded, needled, chemical bonded, and combinations thereof.

13. The method of claim 11 wherein the carrier web comprises fibers selected from the group consisting of: natural fibers, synthetic fibers, polypropylene, polyethylene, polyester, PET, wood pulp, regenerated cellulose, nylon, cotton, bicomponent fibers, continuous fibers, and combinations thereof including blends or layers of one or more of the above fibers.

* * * * *